April 23, 1963     E. C. WEBB     3,086,797
COUPLING DEVICE
Filed Nov. 13, 1958     3 Sheets-Sheet 1
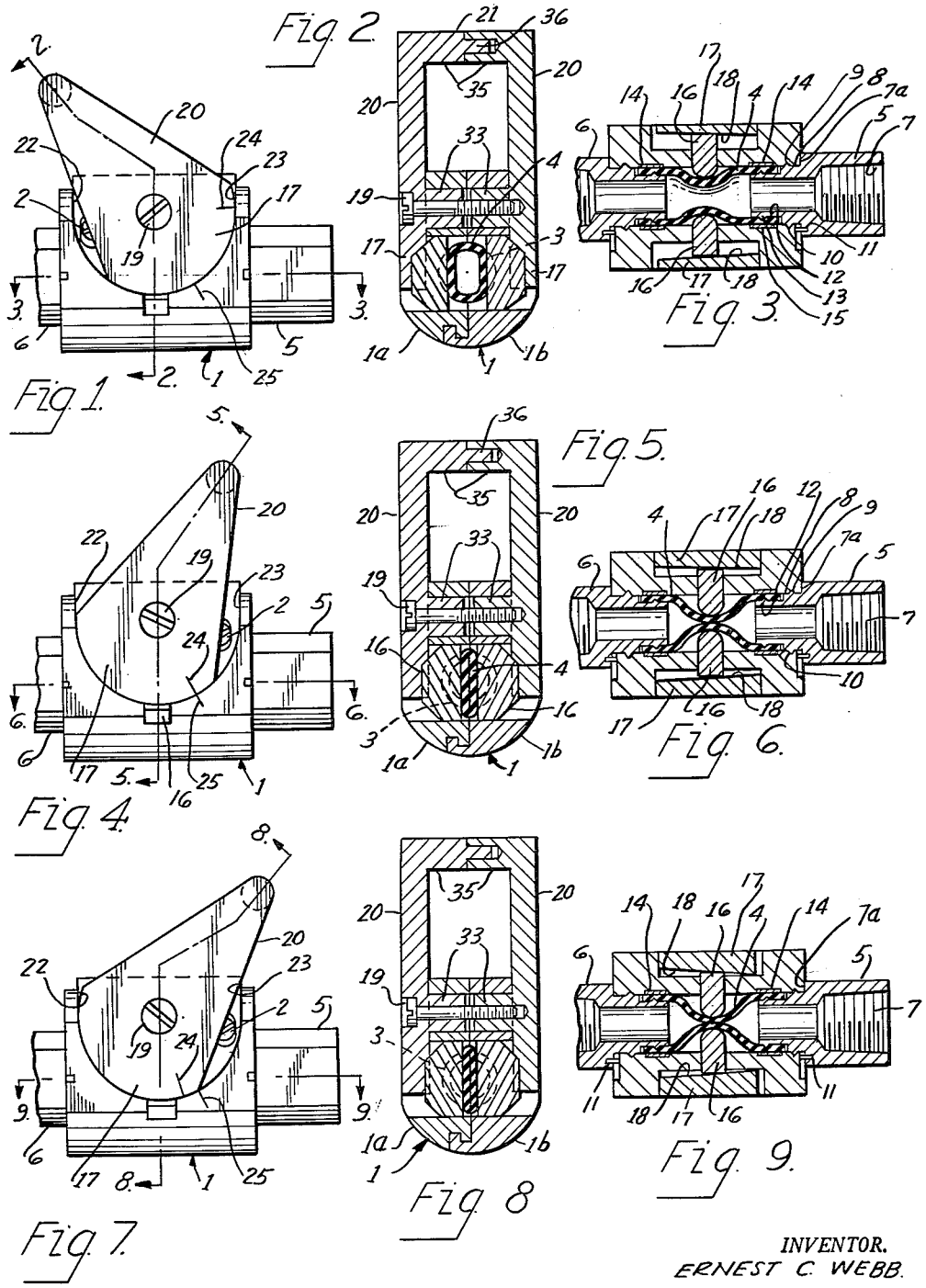
INVENTOR.
ERNEST C. WEBB.
BY
Gehr & Leonard,
his ATTORNEYS.

April 23, 1963   E. C. WEBB   3,086,797
COUPLING DEVICE
Filed Nov. 13, 1958   3 Sheets-Sheet 2
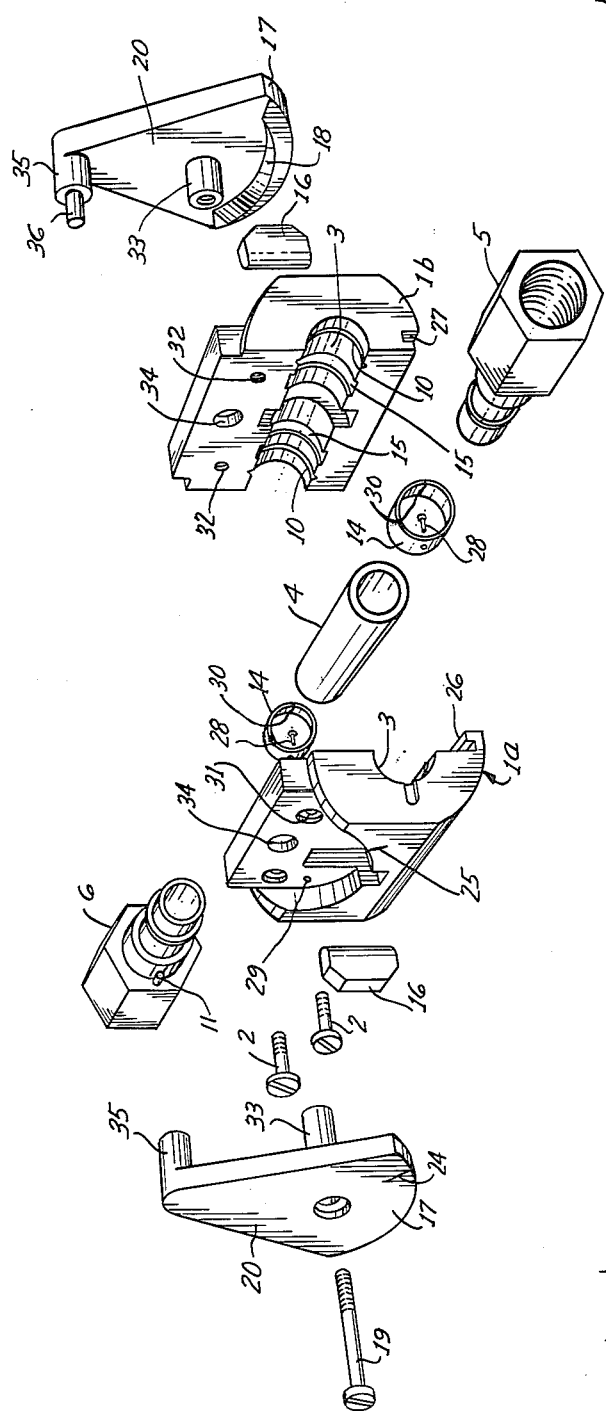
INVENTOR.
ERNEST C. WEBB
BY
Gehr & Leonard,
his ATTORNEYS.

April 23, 1963 E. C. WEBB 3,086,797
COUPLING DEVICE
Filed Nov. 13, 1958 3 Sheets-Sheet 3
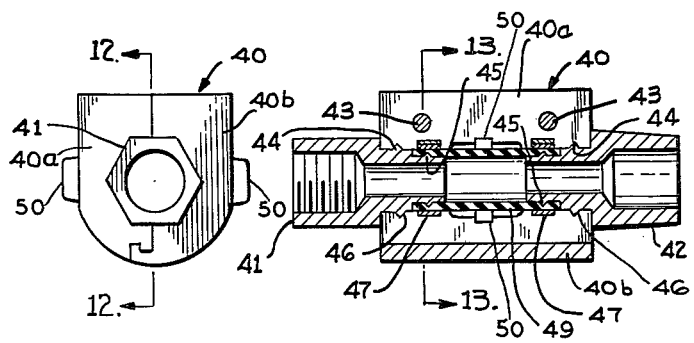
Fig.11. Fig.12.
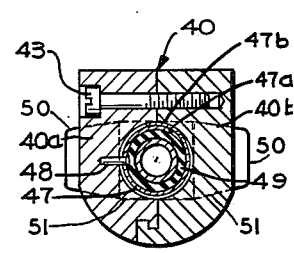
Fig.13.
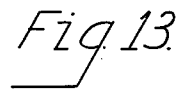
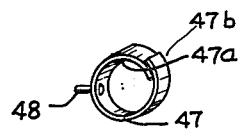
Fig.14.
INVENTOR.
ERNEST C. WEBB
BY
*John H. Leonards*
*his* ATTORNEY

United States Patent Office 3,086,797
Patented Apr. 23, 1963

3,086,797
COUPLING DEVICE
Ernest C. Webb, 24721 W. Lake Road, Bay Village, Ohio
Filed Nov. 13, 1958, Ser. No. 774,576
3 Claims. (Cl. 285—242)

This invention relates to a coupling device for coupling a flexible tube in a flow line, and is a continuation in part of my co-pending application Serial No. 592,958, now abandoned, filed June 21, 1956, and entitled Stop Cock. For the purposes of illustration, the invention is described hereinafter as applied to stop cocks, its use for other purposes being apparent from the illustrative example.

The principal object of the present invention is to provide a pipe fitting, including a member adapted for connection to a pipe line and a collapsible flexible tube telescopically mounted on the member, and having two body portions arranged to be moved relative to each other into clamping relation to the member and tube, thereby to hold the member and tube securely in connected relation, and particularly to a split collar accommodated in the body in surrounding relation to the flexible tube and member and having overlapping free end portions which are cooperable with the tube and body portions to facilitate movement of the body portions into clamping position while preventing pinching of the tube by the body portions.

Other objects and advantages of the invention will become apparent from the following description wherein reference is made to the drawings, in which:

FIG. 1 is a side elevation of a stop cock with the coupling device of the present invention therein, and showing the stop cock in open position;

FIGS. 2 and 3 are a vertical cross sectional view and a horizontal cross sectional view, respectively, taken on the lines 2—2 and 3—3, respectively, of FIG. 1;

FIG. 4 is a side elevation of the stop cock illustrated in FIG. 1 showing the stop cock in position for adjustment;

FIGS. 5 and 6 are a vertical cross sectional view and a horizontal cross sectional view, respectively, taken on the lines 5—5 and 6—6, respectively, of FIG. 4;

FIG. 7 is a side elevation of the stop cock, showing the stop cock in fully closed position;

FIGS. 8 and 9 are a vertical cross sectional view and a horizontal cross sectional view, respectively, taken on the lines 8—8 and 9—9, respectively, of FIG. 7;

FIG. 10 is an exploded perspective view of the stop cock illustrated in FIGS. 1, 4, and 7, showing the component parts thereof;

FIG. 11 is an end elevation of a modified form of the coupling device;

FIG. 12 is a vertical longitudinal sectional view taken on line 12—12 of FIG. 11;

FIG. 13 is a cross sectional view taken on line 13—13 of FIG. 12; and

FIG. 14 is a perspective view of a modified form of a flexible collar used in the present invention.

Referring first to FIGS. 1 through 3, the stop cock comprises a body 1 formed of two portions, 1a and 1b, which are secured together by bolts 2 in a manner hereinafter to be described.

The body is provided with a loingitudinal bore 3 which extends therethrough from end to end and which is adapted to accommodate a flexible tube 4 of rubber or other elastically deformable composition.

Mounted on the opposite ends of the body 1 are fittings 5 and 6, respectively, the fitting 5 being adapted for connection to a supply line and the fitting 6 being adapted for connection to an outlet spout or having a portion in the form of an outlet spout. Since the fittings 5 and 6 are essentially the same in their manner of connection to the body 1, the fitting 5 only will be described in detail The fitting 5 is provided with the usual axial bore and with an enlarged internally threaded portion 7 adapted for connection with an externally threaded pipe line fitting, the periphery of the portion 7 being in the form of a hex nut so that it can be readily gripped by a wrench. In spaced relation to its inlet end, the fitting 5 is provided with a reduced diameter portion 8, a radial shoulder 7a being thus exposed endwise of the fitting at the inner end of the portion 7 and being adapted to bear against the end of the body 1. An annular bead 9 is provided on the portion 8 in spaced relation from the radial shoulder 7a. The bead 9 is adapted to be received tightly in an annular groove 10 in the body 1 when the radial shoulder 7a is firmly against the end of the body 1. A suitable pin 11 is provided in the fitting and extends through the shoulder 7a and engages a suitable radial slot in the end of the body 1 so as to constrain the fitting 5 from rotation relative to the body about the axis of the fitting and body bore.

Beween the bead 9 and the inner end of the fitting 5 the fitting has another reduced diameter portion 12 which has an external diameter less than that of the portion 8. An annular external bead 13 is provided on the portion 12. The portion 12 is adapted to be, and is, received snugly in the end of the tube 4 by slightly stretching the tube thereover until the portion 12 is received for substnatially its full length in the tube 4.

Aligned radially of the body bore 3 with the bead 13 is an expansible and contractible collar 14, preferably of metal, which surrounds the tube 4 and is seated in an annular trough 15 in the body.

As mentioned, the body is made in two portions 1a and 1b. These portions are separated along a plane through the axis of the bore 3 so that the tube and the fittings 5 and 6 can be installed in one half of the body and the other half then drawn tightly into clamping engagement thereto, as will later be described herein. When the parts are clamped together, there is an effective seal between the interior wall of the tube 4 and the exterior of the portion 12, including the bead 13, and the fitting 5 is securely held in fixed position relative to the body 1 both axially and circumferentially of the bore 3.

The fitting 6 is correspondingly securely fixed in position relative to the body 1 and tube 4. With the parts clamped in the condition described, it is apparent that the water introduced through the fitting 5 can flow readily through the tube 4 and out through the fitting 6 which, as mentioned, may be a discharge spout or connection to some other pipe line or spout.

It is apparent that, in order to reduce or stop the flow of water through the tube 4, it is necessary only to collapse the tube radially sufficiently to bring its opposite wall portions into firm juxtaposition with each other. In order to compress and close the tube 4, closure means are provided in the body, these closure means being movable relatively toward and away from each other, and aligned with each other, radially of the tube.

In the form illustrated, the closure means are not only movable relatively toward and away from each other but each is movable relative to the body in a direction toward the other. These closure means may comprise a pair of jaws 16 which are mounted in the body for guided movement transversely of the bore 3. They are positioned endwise of the body so as to engage the portion of the tube 4 which is unsupported internally by the fittings 5 and 6. Furthermore, they are movable inwardly radially of the bore 3 to a position in which the tube 4 not only can be fully closed but also overstressed. When the jaws 16 are unrestrained from radial movement outwardly from the tube 4, the pressure of the water in the tube can restore or expand the tube sufficiently to cause it to move them radially apart so as to allow a passage of substantially full size area through the tube. The tube 4 is preferably sufficiently thick walled and resilient to be self-restoring but it need not be strong enough to withstand the water pressure while it is unsupported radially as it is buttressed and limited in its expansion by the walls of the bore 3.

In order to move the jaws 16 toward each other, cam means are provided. In the form illustrated, the cam means comprise two rotary cams 17 arranged on opposite sides of the body in coaxial relation with each other and for rotation about an axis extending transversely of the bore 3 and offset radially therefrom. The cams have operating surfaces 18 which engage the jaws 16, respectively. The rise of the cam surface 18 of each cam 17 is such that when the cam is rotated in one direction, it moves its associated one of the jaws inwardly of the body relatively toward the jaw so as to compress the tube 4 and reduce or completely close the passage therethrough.

The cams 17 are secured to the body by means of a single bolt 19 which acts not only as a pivot for supporting the cams but also as a means for adjusting the cams so as to prevent overstressing of the tube 4. Each cam has an arm 20 extending radially of the axis of the bolt 19. These arms 20 are connected at their upper ends by a suitable bridge means 21 for rotation together so that when installed they are in the form of a yoke. They are movable, however, relative to each other in a direction endwise of the bolt 19. The body is arranged so that it presents stop shoulders, such as indicated at 22 and 23, in a position to be engaged by the arms 20 when the arms are rotated as a unit to their extreme position in the closing direction and in the opening direction, respectively. When the arms 20 are against the shoulder 23, the stop cock is in closed position.

One of the cams is provided on its outer face with a calibrating mark 24 and the body is provided with a match mark 25. These marks are for assisting in the proper adjustment of the cams so as to assure a firm and effective closure of the tube 4 while eliminating any overstressing and consequent undue wear and deterioration of the tube by the jaws 16.

Referring to FIG. 4, it is to be noted that the marks 24 and 25 are in alignment or registry while the arm 20 is close to, but spaced from, the shoulder 23. Normally the fluid pressure within the tube 4 urges the jaws 16 apart and thereby exerts an outward pressure on the cams 17. By virtue of the bolt 19 the cams 17 are movable bodily toward each other independently of their rotation and thus are operable to be moved so as to move the jaws 16 relatively toward each other independently of rotation of the cams 17. Accordingly, to adjust the stop cock so as to assure the effective cutoff without overstressing the material of the tube 4, the handles or arms 20 are rotated until the match marks 24 and 25 are in registry. While they are in registry, the bolt is turned just enough to collapse the tube 4 sufficiently to stop the discharge of water through the tube. This means that the tube has been fully collapsed and its walls brought into firm resilient contact with each other sufficient to prevent the passage of fluid through the tube but insufficient to overstress and overcompress the tube. Tighter closure with some factor of safety is assured because of the fact that after the adjustment is made the arms 20 still can be moved farther in a clockwise direction in FIG. 4 until they engage the shoulder 23, thus assuring some additional compression other than that barely necessary to stop the flow but limiting the additional compression so that the tube is not damaged. Obviously, by swinging the arms clockwise, the tube can be permitted to open to the degree desired, the opening being effected by the pressure of the water within the tube. It is apparent, therefore, that the safe degree of closing pressure is determined and set independently of the predilections or strength of the operator so that sufficiently firm closure to prevent "wire drawing" is obtained without any danger of overstressing the tube 4.

As mentioned, it is desirable that the structure be made relatively simple and arranged so that it can be readily serviced.

For this purpose, the various operating parts are made as illustrated in FIG. 10. As there shown, the body 1 is comprised of two halves 1a and 1b which are separated on a plane through the axis of the bore 3. The half 1a of the body is provided with a flange 26 along one edge, the flange extending generally parallel to the axis of the bore 3. The other half is provided with a complementary groove 27 in which the flange 26 can be received and firmly seated while the two halves are separated by being swung apart about the hinge formed by the flange 26 and walls of the groove 27. In this open position of the halves, the two fittings 5 and 6 are installed in the tube and this assemblage of fittings and tube are installed in one body half, such as the half 1a. The expansible collars 14 surrounding the respective end portions of the tube are secured to the body half 1a by means of small rivets 28 which are received in passages, such as indicated at 29, in the half of the body 1a. In this condition, the halves of the body are adapted to be swung together about the juncture of the flange 26 and groove 27. The expansible collars 14 are slit, as indicated at 30, the slits preferably being positioned at the opposite side of the bore 3 from the pin 28. The collars 14 are preferably of very thin, stiff, wear resistant sheet metal or plastic material and are preferably resilient. As the body halves are swung together about the flange 26, the collars are gradually closed into tight embracing relation to the tube 4.

In order to draw the two halves of the body firmly together, the body half 1a is provided with a pair of apertures 31 aligned with a pair of suitable internally threaded inserts 32, respectively, in the body half 1b. The apertures 31 and inserts 32 are disposed at the opposite side of the bore 3 from the flange 26. The apertures 31 are preferably elongated slightly in a direction radially of the axis of the bore 3. Thus the bolts 2 can be inserted through the apertures 31 and engaged with the inserts 32 and then operated to draw the two halves of the body into firm juxtaposition with each other, the angularity between the axis of the inserts 32 and the axis of the apertures of the openings 31 as the body halves change their relative positions being compensated for by this elongation of the apertures.

The jaws 16 are inserted in suitable slots in the body, as illustrated. The cams with their operating arms, are installed after the jaws have been installed and the body halves drawn together. The cams 17 are provided with inwardly directed hollow trunnions 33 through which the bolt 19 extends, the right hand trunnion in FIG. 10 being provided with an internally threaded insert for threaded engagement with the end of the bolt 19. The trunnions 33 are of such length as to limit the maximum bodily adjustment of the arms 20 and cams 17 and 18 toward each other. The trunnions 33 are received in suitable bores 34 in the body halves 1a and 1b, respectively, and thereby rotatably support the cams 17 and arms 20.

The arms 20 have inwardly directed bosses 35 which are arranged to engage in endwise abutting relationship. A suitable pin 36 is provided for engaging aligned passages in the bosses 35. If desired, the pin 36 can be made integral with one of the bosses 35. When the cams are secured to the body by the bolt 19, the two arms are secured for rotation about the axis of the bolt 19 in fixed relation to each other by means of the bosses 35 and pin 36 but are free to be moved toward and away from each other in a direction parallel to the axis of the bolt 19.

Referring next to the modified form of the device illustrated in FIGS. 11 through 14, the structure is the same in all respects as the structure heretofore described, except that the tube collapsing means are operated directly by hand, not by cams, and for the fact that a modified flexible collar is substituted for the collar 14, heretofore described.

As illustrated, the body 40 comprises two separable portions 40a and 40b, in the ends of which are connected fittings 41 and 42. The body portions are arranged in the manner heretofore described in connection with portions 1a and 1b, and are drawn tightly together by means of screws 43. The fitting 41 is adapted for connection to a pipe and the fitting 42 may be merely a water spout. Since the connection between the fittings 41 and 42 and the body halves are the same, only the fitting 41 will be described in detail. The fitting 41 has a peripheral bead 44, corresponding to the bead 9 heretofore described, and a bead 45, corresponding to the bead 13 heretofore described. Correspondingly, the body portions 40a and 40b are provided with an annular groove 46 adapted to receive the bead 44. A flexible collar, indicated generally at 47, is secured by means of a rivet 48 in one of the body halves 40a. This flexible collar, however, is a split collar having end portions 47a and 47b which overlap each other circumferentially of the body, or of the axis of the fitting even when unclamped by the body portions and which slide across each other to effect a greater degree of overlap when the body portions are drawn firmly together.

The flexible tube 49 is received on the inner end of the fitting 41 over the bead 44 in the same manner as the tube 4 is received over the bead 9 of the fitting 5.

Jaws 50, comparable to the jaws 16, are mounted in passages 51 in the body for movement radially inwardly of the body to collapse the tube 49, and extended outside the body so that they can be gripped between the fingers and operated to collapse the tube.

This modified form has proven highly satisfactory in that, when the tube 49 is placed in one of the body portions with the inner portion of the fitting accommodated in the tube 49, and the body halves are drawn tightly together, the end edges of the collar 47 do not dig into the tube but readily slide on each other in face to face radially superposed relation, and also on the inner surfaces of their accommodating grooves in the body portions during contraction of the collar. Any danger of their engaging endwise at their edges and jamming and preventing proper closure is eliminated, with the result that the parts can be more readily assembled.

From the foregoing description, it is apparent that the parts of the stop cock can be readily formed and readily assembled and disassembled. For assemblage and diassemblage, the only tool required is a screw driver. There are no seats or cooperating parts which need to be accurately fitted. All that is necessary is to replace a small length of rubber or resilient tubing 4. None of the other parts requires replacement.

Having thus reconditioned the stop cock, it is only necessary to turn the arms 20 until the match marks 24 and 25 are in registry, then to loosen the bolt 19, if necessary, so that there is a flow of water and then gradually to tighten the bolt just until the flow is stopped, whereupon the stop cock is in operating condition.

Having thus described my invention, I claim:

1. A coupling device comprising a pipe fitting adapted for connection to a flow line and having a rigid tube thereon, a collapsible flexible tube having one of its end portions fitting onto the rigid tube, a body including a plurality of body portions movable relatively toward each other transversely of the tubes into embracing relation to at least one end portion of the collapsible flexible tube, coacting retaining means on the rigid tube and in the body portions to clamp and support the rigid tube in such body portions and to constrain the rigid tube from axial movement therein, a curvilinear contractible split collar consisting of a single thin band of relatively stiff flexible sheet material which has its ends free from connection with each other and the free end portions overlapping each other circumferentially of the collar in face to face relation with one of the overlapped faces superposed on the other radially of the flexible tube when the collar is in uncontracted condition and which is arranged when unstressed to embrace the periphery of said end portion of the collapsible tube, the body portions having surfaces firmly engaging the collar in a manner to contract the collar by movement of its ends circumferentially of the tube and thereby compress the flexible tube radially about the rigid tube when the body portions are drawn toward each other to final assembled position in a direction transversely of the tubes, means for securing the body portions in said final position, and detachable hinge means formed integral with the body portions and hingedly connecting the body portions together for swinging together and apart about a hinge axis substantially parallel to, and offset from, the axis of the tubes, said collar being disposed around the flexible tube with the free ends of the collar spaced circumferentially of the collapsible tube from said hinge axis.

2. A coupling device comprising a pipe fitting adapted for connection to a flow line and having a rigid tube thereon, a collapsible flexible tube having one of its end portions fitting into the rigid tube, a body including a plurality of body portions movable relatively toward each other transversely of the tubes into embracing relation to at least one end portion of the collapsible flexible tube, coacting retaining means on the rigid tube and in the body portions to clamp and support the rigid tube in such body portions and to constrain the rigid tube from axial movement therein, a curvilinear contractible split collar in the form of a single thin band of relatively stiff flexible material which has its ends free from connection with each other, which is arranged when unstressed to embrace the periphery of said end portion of the collapsible tube, and of which the free end portions overlap each other circumferentially of the collar in face to face relation with the overlapped faces superposed on each other radially of the flexible tube when the collar is in uncontracted condition, the body portion having surfaces firmly engaging the collar in a manner to contract the collar by movement of its ends circumferentially of the tube and thereby compress the flexible tube radially about the rigid tube when the body portions are drawn toward each other to final assembled position in a direction transversely of the tubes, and means for securing the body portions in said final position.

3. A coupling device according to claim 2 wherein means are provided which secure the collar and one of the body portions in a fixed circumferential position relative to each other at a location on the collar spaced circumferentially from the juncture of the body portions, and in which position the free ends of the collar are offset circumferentially from the juncture between the body portions.

References Cited in the file of this patent
UNITED STATES PATENTS

| | | |
|---|---|---|
| 188,886 | Galvin | Mar. 27, 1877 |
| 1,212,817 | Russell | Jan. 16, 1917 |
| 1,300,956 | Greve | Apr. 15, 1919 |
| 1,505,255 | Gold | Aug. 19, 1924 |
| 1,726,176 | Burke | Aug. 27, 1929 |
| 2,674,435 | Angell | Apr. 6, 1954 |

FOREIGN PATENTS

| | | |
|---|---|---|
| 484,838 | Great Britain | May 11, 1938 |